Patented Sept. 9, 1947

2,427,250

UNITED STATES PATENT OFFICE 2,427,250

SWEETENING OF HYDROCARBON LIQUIDS

Donald C. Bond, Northbrook, Ill., assignor to The Pure Oil Company, Chicago, Ill., a corporation of Ohio No Drawing. Application December 6, 1944, Serial No. 566,954

14 Claims. (Cl. 196—29)

This invention relates to a method for sweetening hydrocarbon liquids containing mercaptans.

Gasoline, and other hydrocarbon oils, frequently contain mercaptans which are objectionable because of the bad odor, and because of their detrimental effect on the lead susceptibility of the gasoline. Various methods have been proposed for either eliminating mercaptans from the oil or converting mercaptans to disulfides which have a sweet odor. Among the methods which have been proposed for removing mercaptans are the Mercapsol and Solutizer processes, both of which rely on aqueous caustic alkali solutions containing solubility promoters such as alkali metal naphthenates and phenolates or alkali metal isobutyrates. These processes have proved to be effective for removing the mercaptans from a majority of gasolines, but in certain cases these processes are ineffective for removing all the mercaptans unless an excessive volume of treating solution is used.

One of the methods which has heretofore been proposed for converting mercaptans to disulfides is a process involving either air-blowing of gasoline in the presence of an alkali solution containing an oxidation catalyst such as hydroquinone, or blowing of the alkali solution containing the catalyst, such as hydroquinone, with air and then contacting the gasoline with the oxidized solution. The principal objection to this type of process is that hydroquinone and similar oxidation catalysts upon over-oxidation are irreversibly oxidized to products which no longer act as oxidation catalysts, and therefore the catalyst can be easily destroyed unless close control is exercised over the air-blowing operation.

I have discovered that mercaptans in gasoline and other hydrocarbon liquids can be readily converted to disulfides and the liquid sweetened by absorbing air in the gasoline, or other liquid, under substantially atmospheric temperature and pressure, and contacting the gasoline containing the absorbed air with aqueous alkali solution containing a small amount of an oxidation catalyst. At temperatures of about 25° C., and at atmospheric pressure, gasoline in equilibrium with air contains enough oxygen absorbed therein to oxidize approximately .03% by weight of mercaptan sulfur. Therefore if a gasoline or other oil to be treated contains not more than the amount of mercaptan sulfur which can be oxidized by the amount of air absorbable under the particular temperature and pressure conditions existing, it can be contacted with air until it is in equilibrium with the atmosphere and then contacted with an alkali solution containing a small amount of oxidation catalyst in order to sweeten the gasoline. In this manner the oxidation catalyst is not over-oxidized because there is not sufficient oxygen present to oxidize the catalyst beyond the active quinone form.

In accordance with my invention the oil from which the mercaptans are to be removed may first be treated to extract the bulk of the mercaptans. For this purpose the gasoline may be treated with an aqueous alkali solution containing solubility promoters such as sodium or potassium naphthenates, phenolates, isobutyrates, or a combination thereof. As an example of a solution which is satisfactory for this purpose may be mentioned an aqueous alkali solution prepared by mixing together 18.3 parts by weight of sodium hydroxide, 18.7 parts by weight of naphthenic acid, 6.3 parts by weight of commercial cresol and 56.7 parts by weight of water, known as "Mercapsol" solution. When contacted with from 5 to 20% by volume of this treating solution the bulk of mercaptans in gasoline is readily extracted, and the treating solution can be readily regenerated by steam-stripping or air-blowing. If the treating solution is to be regenerated by air-blowing a small amount, approximately 1 to 3% by weight, of an oxidation catalyst such as hardwood tar, boiling between approximately 240–300° C. (U. O. P. Inhibitor No. 1), pyrogallol, normal-butyro pyrogallol, butyl pyrogallol, anthragallol, tannic acid, gallic acid, 3,4 dihydroxy diphenyl, or 2,5 dihydroxy diphenyl, may be added to the treating solution in order to act as an oxidation catalyst in the regeneration step. It is to be understood that any suitable method of extracting mercaptans from gasoline may be used as a preliminary step. When the gasoline contains in excess of .03% by weight of mercaptan sulfur it is preferred that the gasoline be treated in a preliminary step with "Mercapsol" solution, or in such other manner to remove the bulk of the mercaptans in order to reduce the mercaptan sulfur content to a point at which the gasoline can be sweetened in accordance with my invention.

The gasoline, or other oil, either with or without previous treatment to extract mercaptans, is contacted with air in any suitable manner so that the gasoline is saturated with air under the existing conditions of temperature and pressure. This may be accomplished by bubbling a stream of air through the gasoline in a closed container, or bringing gasoline in countercurrent contact with air in a tower packed with Raschig rings, or other contact surfaces. The gasoline, or other oil saturated with air is then brought in contact with an aqueous alkali solution, preferably a solution of sodium or potassium hydroxide containing a small amount of oxidation catalyst in solution or suspension therein. As oxidation catalyst I prefer to use these phenolic compounds or substances which are capable of being oxidized to the quinone form. As examples of oxidation catalysts which are useful may be mentioned butyl pyrogallol, pyrogallol, normal-butyro pyrogallol, hydroquinone, anthragallol, gallic acid, tannic acid, 3,4, dihydroxy diphenyl, 2,5, dihydroxy diphenyl and the hardwood tar fraction boiling between approximately 240–300° C., sold commercially as U. O. P. Inhibitor No. 1. Contact between the treating solution and the gasoline or other oil may be affected by passing it in countercurrent relationship through a tower packed with contacting bodies such as Raschig rings, or by forcing the gasoline under a slight pressure through a body of treating solution and thereafter separating the treating solution from the gasoline.

In accordance with my invention the treating solution may be a solution of alkali metal hydroxide and oxidation catalyst in water, or may be an aqueous alkali solution containing in addition to the oxidation catalyst, a solubility promoter of the type hereinbefore mentioned to make the process more efficient. The treating solution does not require regeneration and can be used repeatedly without any substantial loss in efficiency.

In order to illustrate the invention a sample of straight run gasoline containing .03% by weight of mercaptan sulfur was contacted in a countercurrent tower with 25% by volume of "Mercapsol" solution prepared by mixing 18.3 parts by weight of sodium hydroxide, 6.3 parts by weight of commercial cresol, 18.7 parts by weight of naphthenic acid, 56.7 parts by weight of water, and the mercaptan sulfur was reduced to .011%. The gasoline was then shaken in a can in contact with air at room temperature and then was forced through a body of 750 cc. of "Mercapsol" solution containing 1% by weight of "I Tar Oil," a settled heavy wood tar fraction made by Tennessee Products Corporation and boiling principally within the range of 240–300° C., under a pressure of ten pounds per square inch of nitrogen at the rate of 30 cc. per minute. The mercaptan sulfur in the resulting gasoline was reduced to .002% by weight.

In another example cracked gasoline containing originally .058% by weight of mercaptan sulfur was given a treatment with 21% by volume of the same "Mercapsol" solution used in the first example and the mercaptan sulfur was reduced to .008%. This gasoline after having been shaken with air was forced under ten pounds of air pressure through a body of 750 cc. of the "Mercapsol" solution containing 1% by weight of "I Tar Oil" at the rate of 29 cc. per minute, and the mercaptan sulfur in the resulting gasoline was reduced to a negligible quantity and the gasoline was doctor sweet.

In another example Stoddard's solvent having a mercaptan sulfur content of .015% after having been shaken with air was forced at the rate of 30 cc. per minute under ten pounds of air pressure through a treating tower filled with 750 cc. of the same "Mercapsol" solution used in the first example, but containing 1% by weight of "I Tar Oil" without preliminary treatment with "Mercapsol" solution to extract mercaptans. The Stoddard's solvent was doctor sweet and upon filtration through clay and redistillation was corrosion negative and doctor sweet.

It will be understood that the amount of air which can be absorbed by a particular liquid will depend on the liquid itself as well as the temperature and pressure conditions under which the liquid is maintained. The amount of air absorbed by any particular liquid, such as gasoline, at given temperature and pressure conditions can be readily determined and from a determination of the mercaptan sulfur of the sample, the necessity for a pretreatment to remove mercaptans can be determined. Ordinarily in treating gasoline at normal atmospheric temperature and pressure, if the mercaptan sulfur content is above .03% by weight, it is advisable to extract a portion of the mercaptans prior to the sweetening operation. In some cases where the mercaptan sulfur content is below .03% by weight it may be expedient to extract a portion of the mercaptans before sweetening in order to increase the lead susceptibility of the gasoline.

It should be understood, however, that gasoline and other hydrocarbon liquids containing in excess of .03% by weight of mercaptans can be sweetened by air absorption followed by contact with alkali solution containing an oxidation catalyst as previously set forth, by absorbing air in the gasoline or other liquid under sufficient pressure to absorb enough air to oxidize the entire mercaptan content of the liquid and contacting the liquid containing the absorbed air with the alkali solution containing the oxidation catalyst under absorption pressure.

My invention is particularly applicable to treatment of refractory stocks, the mercaptan sulfur content of which cannot be lowered sufficiently by extractive methods without excessive cost.

It will be seen therefore that I have provided a simple method for sweetening hydrocarbon oils in an inexpensive manner whereby the solution can be repeatedly used without fear of destroying the active ingredients therein.

It is claimed:

1. The method of sweetening hydrocarbon liquid containing mercaptans comprising contacting the liquid with sufficient aqueous alkali solution containing free alkali metal hydroxide and a solubility promoter to extract the major portion of the mercaptans from the liquid, thereafter absorbing in the liquid sufficient air to oxidize the remaining mercaptans to disulfides and contacting the liquid containing absorbed air in the absence of further quantities of air with aqueous alkali solution containing in solution a small amount of a catalyst comprising a phenolic substance capable of being oxidized to the quinone form.

2. The method of sweetening hydrocarbon liquid containing mercaptans comprising contacting the liquid with air until the liquid is in equilibrium with the atmosphere and then contacting the liquid in the absence of further quantities of air with aqueous alkali solution containing an organic catalyst capable of promoting oxidation of mercaptans to mercaptides and which is susceptible to destruction upon oxidation.

3. Method in accordance with claim 2 in which the major portion of mercaptans is extracted from the liquid prior to contacting it with air.

4. The method of converting mercaptans in hydrocarbon liquid to disulfides consisting in saturating said liquid with air, contacting said saturated liquid with an alkali solution containing a small amount of an organic oxidation catalyst which is itself capable of oxidtion and separating the liquid from the alkali solution.

5. Method in accordance with claim 4 in which the oxidation catalyst is a phenolic substance capable of being oxidized to the quinone form.

6. Method in accordance with claim 4 in which the hydrocarbon liquid is saturated with air at atmospheric temperature and pressure.

7. The method of sweetening gasoline boiling hydrocarbons consisting in extracting the major portions of the mercaptans therefrom, thereafter saturating the gasoline with air, contacting the saturated gasoline with aqueous alkali solution containing a small amount of an organic oxidation catalyst which is itself capable of oxidation and separating the gasoline from the alkali solution.

8. Method in accordance with claim 7 in which the mercaptan content of the gasoline is reduced below .03% by weight by extraction.

9. Method in accordance with claim 7 in which the oxidation catalyst is a hard wood tar fraction boiling between approximately 240 and 300° C.

10. The method of sweetening gasoline consisting in extracting the major portions of the mercaptans therefrom with aqueous alkali solution containing free alkali metal hydroxide and a solubility promoter for mercaptans, absorbing sufficient air in the extracted gasoline to oxidize the remaining mercaptans, contacting the gasoline containing the absorbed air with aqueous alkali solution containing an organic oxidation catalyst itself capable of oxidation and separating the gasoline from the alkali solution.

11. Method in accordance with claim 10 in which the organic oxidation catalyst comprises a hydroxy aromatic substance capable of being oxidized to the quinone form.

12. Method in accordance with claim 10 in which the mercaptan content of the gasoline is reduced by extraction to not more than .03% by weight.

13. The method in accordance with claim 10 in which the oxidation catalyst is a phenolic substance capable of being oxidized to the quinone form.

14. Method in accordance with claim 4 in which the liquid is saturated with air under pressure sufficiently high to absorb enough air to oxidize the entire mercaptan content of the liquid and the liquid containing the absorbed air is contacted with the alkali solution without substantial release of pressure.

DONALD C. BOND.

REFERENCES CITED

The following references are of record in the file of this patent:

UNITED STATES PATENTS

| Number | Name | Date |
|---|---|---|
| 2,315,530 | Loyd | Apr. 6, 1943 |
| 2,015,038 | Pevere | Sept. 17, 1935 |
| 2,164,665 | Rogers et al. | July 4, 1939 |
| 2,340,157 | Thacker | Jan. 25, 1944 |

FOREIGN PATENTS

| Number | Country | Date |
|---|---|---|
| 684,618 | France | Mar. 18, 1930 |
| 449,783 | Great Britain | July 3, 1936 |

OTHER REFERENCES

Morrell, "Systematic Refining of Cracked Distillates," Ind. Eng. Chem., July, 1926, pages 733 to 738. (Copy in Library.)